United States Patent
Oh et al.

(10) Patent No.: US 9,862,614 B2
(45) Date of Patent: Jan. 9, 2018

(54) PREPARATION METHOD OF HYDROPHOBIC SILICA AEROGEL

(71) Applicant: LG CHEM, LTD., Seoul (KR)

(72) Inventors: Kyoung Shil Oh, Daejeon (KR); Jin Hee Oh, Daejeon (KR); Ye Hon Kim, Daejeon (KR); Dong Hyun Cho, Daejeon (KR); Mi Ri Kim, Daejeon (KR); Sung Min Yu, Daejeon (KR); Je Kyun Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 281 days.

(21) Appl. No.: 14/650,519

(22) PCT Filed: Feb. 4, 2015

(86) PCT No.: PCT/KR2015/001163
§ 371 (c)(1),
(2) Date: Jun. 8, 2015

(87) PCT Pub. No.: WO2015/119430
PCT Pub. Date: Aug. 13, 2015

(65) Prior Publication Data
US 2016/0264427 A1    Sep. 15, 2016

(30) Foreign Application Priority Data

Feb. 6, 2014   (KR) .................. 10-2014-0013862
Feb. 4, 2015   (KR) .................. 10-2015-0017243

(51) Int. Cl.
*C01B 33/158* (2006.01)
*C01B 33/16* (2006.01)

(52) U.S. Cl.
CPC .......... *C01B 33/1585* (2013.01); *C01B 33/16* (2013.01); *C01P 2006/11* (2013.01); *C01P 2006/12* (2013.01)

(58) Field of Classification Search
None
See application file for complete search history.

(56) References Cited

U.S. PATENT DOCUMENTS 7,897,648 B2 * 3/2011 Halimaton .......... C01B 33/1585
                                                        106/490
2001/0034375 A1   10/2001 Schwertfeger
(Continued)

FOREIGN PATENT DOCUMENTS

DE       19648798 A1    6/1998
KR       20000057244    9/2000
(Continued)

OTHER PUBLICATIONS

Dorcheh et al (Silica aerogel; synthesis, properties and characterization, J Mat Proc Tech 199 (2008) 10-26).*
(Continued)

*Primary Examiner* — Melvin C. Mayes
(74) *Attorney, Agent, or Firm* — Dentons US LLP

(57) ABSTRACT

Provided is a method for preparing a hydrophobic silica aerogel by using a Soxhlet extraction, and a hydrophobic silica aerogel prepared by using the method. Since the preparation method according to the present invention may simultaneously perform washing and drying of a hydrophobic silica wet gel as well as solvent substitution and may remove an extraction solvent without an additional separation process, a hydrophobic silica aerogel having low tap density and high specific surface area may be easily prepared.

25 Claims, 2 Drawing Sheets

(56) References Cited

U.S. PATENT DOCUMENTS

| | | | |
|---|---|---|---|
| 2004/0029982 A1* | 2/2004 | Erkey | B01J 21/18 |
| | | | 516/98 |
| 2011/0243837 A1 | 10/2011 | Shan et al. | |
| 2012/0225003 A1* | 9/2012 | Joung | C01B 33/166 |
| | | | 423/338 |
| 2014/0273701 A1* | 9/2014 | Samanta | E04B 1/78 |
| | | | 442/334 |

FOREIGN PATENT DOCUMENTS

| | | |
|---|---|---|
| KR | 20100010350 | 2/2010 |
| KR | 101155431 B1 | 6/2012 |
| KR | 20120070948 | 7/2012 |
| KR | 20130051304 | 5/2013 |
| WO | 2008/143384 A1 | 11/2008 |
| WO | 2009/033065 A1 | 3/2009 |

OTHER PUBLICATIONS

Hong et al (Synthesis of spherical silica aerogel powder by emulsion polymerization technique, J Ceram Proc Res. vol. 13, Special. 1. (2012) pp. s145-s148).*

Qiuli Yang et al., "Porous organic-inorganic hybrid aerogels based on bridging acetylacetonate", Microposrous and Mesoporous Materials vol. 187, Dec. 27, 2013, pp. 108-113.

Cho et al., "Study on the Extraction of Monasil PCA using Liquid CO2," Korean Chem. Eng. Res. 50 (4): 684-689 (2012).

* cited by examiner

PREPARATION METHOD OF HYDROPHOBIC SILICA AEROGEL

This application is a National Stage Application of International Application No. PCT/KR2015/001163, filed Feb. 4, 2015, and claims the benefit of Korean Application No. 10-2014-0013862, filed Feb. 6, 2014 and Korean Application No. 10-2015-0017243, filed Feb. 4, 2015, all of which are hereby incorporated by reference in their entirety for all purposes as if fully set forth herein.

TECHNICAL FIELD

The present invention relates to a method for preparing a hydrophobic silica aerogel by using a Soxhlet extraction which may simultaneously perform washing and drying as well as solvent substitution, and a hydrophobic silica aerogel prepared by using the method.

BACKGROUND ART

An aerogel, as a high specific area (500 m$^2$/g or more), ultra-porous material having a porosity of about 85% to 99.9% and a pore diameter of about 1 nm to about 100 nm, has excellent characteristics such as ultra lightweightness, ultra insulation, and ultra-low dielectric constant. Due to the excellent physical properties, research into the applications of the aerogel as a transparent insulator and an environmentally-friendly high-temperature insulator, an ultra-low dielectric thin film for a highly integrated device, a catalyst and a catalyst support, an electrode for a supercapacitor, and an electrode material for desalination as well as the development of an aerogel material has been actively conducted.

The biggest advantage of the aerogel is super-insulation having a thermal conductivity of 0.300 W/m·K or less which is lower than that of an organic insulation material such as a typical Styrofoam. Fire vulnerability and the generation of toxic gas in case of fire, i.e., fatal weaknesses of a typical organic insulation material, may be addressed due to the low thermal conductivity.

In general, a wet gel is prepared from a silica precursor such as water glass or tetraethoxysilane (TEOS), and an aerogel is then prepared by removing a liquid component in the wet gel without destroying its microstructure. The silica gel prepared by the above-described method is prepared in three forms, powder, granules, and monolith, and is mainly prepared in a powder form.

Silica aerogel powder may be normally commercialized in a form, such as an aerogel blanket or aerogel sheet, by compositing with fibers. Also, since the blanket or sheet, which is prepared by using a silica aerogel, has flexibility, it may be bent, folded, or cut to a predetermined size or shape. Thus, the silica aerogel may be used in household goods, such as jackets or shoes, as well as industrial applications such as an insulation panel of a liquefied natural gas (LNG) line, an industrial insulation material and a space suit, transportation and vehicles, and an insulation material for power generation. Furthermore, in a case where a silica aerogel is used in a fire door as well as a roof or floor in a home such as an apartment, it has a significant effect in preventing fire.

The core technology of aerogel manufacturing process is a drying technique capable of preparing a gel by drying without shrinkage while maintaining the structure of the wet gel. A typical drying method may include supercritical drying. However, production costs of the supercritical drying are not only high, but also there is a high risk due to the high pressure. Furthermore, since the supercritical drying is a process of using an autoclave in which a continuous process is not possible, the supercritical drying has many limitations in terms of economic factors, stability, and continuity of the process.

PRIOR ART DOCUMENTS

Patent Document (Patent Document 1) Korean Patent Application Laid-Open Publication No. 2012-0070948 (publication date Jul. 2, 2012)

DISCLOSURE OF THE INVENTION

Technical Problem

An aspect of the present invention provides a method for preparing a hydrophobic silica aerogel, in which a hydrophobic silica aerogel having excellent tap density and specific surface area may be prepared by using a Soxhlet extraction method which may simultaneously perform washing and drying as well as solvent substitution.

Another aspect of the present invention provides a hydrophobic silica aerogel that is prepared by the above method.

Another aspect of the present invention provides a blanket including the hydrophobic silica aerogel that is prepared by the above method.

Technical Solution

According to an aspect of the present invention, there is provided a method for preparing a hydrophobic silica aerogel including Soxhlet extracting a hydrophobic silica wet gel.

According to another aspect of the present invention, there is provided a hydrophobic silica aerogel that is prepared by the method.

According to another aspect of the present invention, there is provided a blanket including the hydrophobic silica aerogel that is prepared by the method.

Advantageous Effects

A preparation method according to the present invention may simultaneously perform washing and drying of a hydrophobic silica wet gel as well as solvent substitution. Also, since an extraction solvent may be removed by natural drying without an additional separation process, a hydrophobic silica aerogel having improved tap density and specific surface area may be easily prepared.

Furthermore, the risks due to high temperature and high pressure are low, because the preparation method according to the present invention is performed under relatively mild conditions (low temperature and low pressure) in comparison to a typical high-temperature and high-pressure drying process, and continuous reuse of the extraction solvent is also possible. Thus, there are many advantages in terms of economy and stability.

BRIEF DESCRIPTION OF THE DRAWINGS

The following drawings attached to the specification illustrate preferred examples of the present invention by example, and serve to enable technical concepts of the present invention to be further understood together with detailed description of the invention given below, and therefore the present invention should not be interpreted only with matters in such drawings.

DESCRIPTION OF REFERENCE NUMERALS

Figure 1:
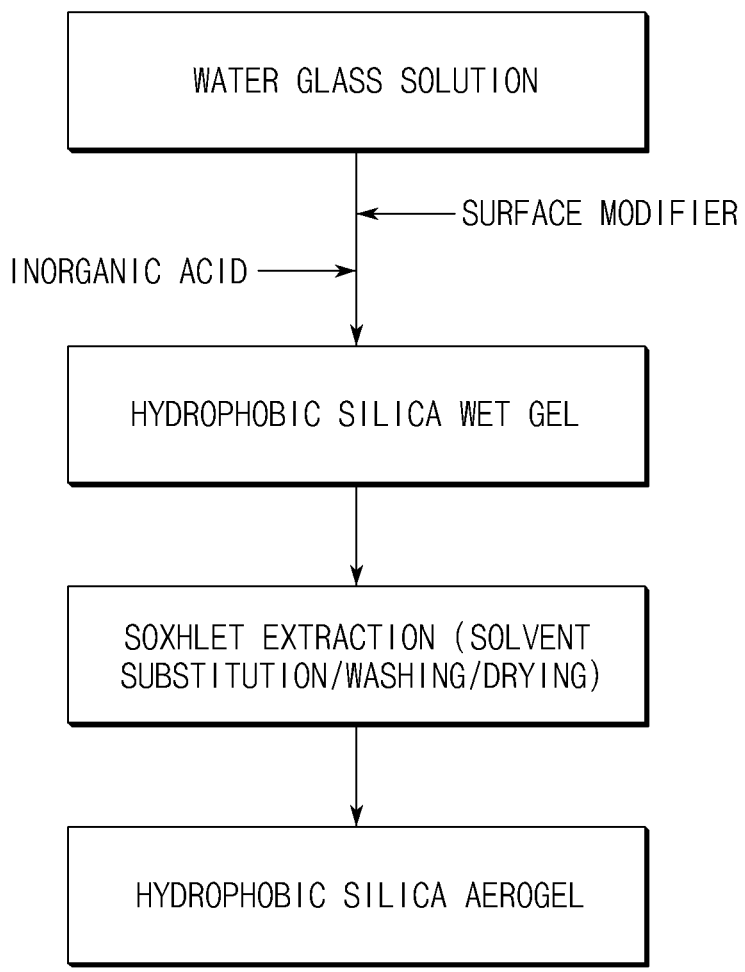
FIG. 1 is a block diagram sequentially illustrating a preparation process of a hydrophobic silica aerogel according to an embodiment of the present invention.

100 Soxhlet extractor
10 extraction solvent reservoir
30 reboiler
40 condenser
50 extractor
60 siphon arm
70 cooling circulation tank Mode For Carrying Out The Invention Hereinafter, the present invention will be described in more detail to allow for a clearer understanding of the present invention.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

In general, a hollow of a silica wet gel prepared using water glass is filled with water, i.e., a solvent. Accordingly, when the solvent is removed by a subsequent drying process, shrinkage and cracking of a pore structure occur due to high surface tension of water at a gas/liquid interface while the liquid phase solvent is evaporated into a gas phase. As a result, a decrease in specific surface area and changes in pore structure may occur in the finally prepared silica aerogel. Thus, in order to maintain the pore structure of the wet gel, there is not only a need to substitute water having high surface tension with an organic solvent having relatively low surface tension, but also to develop a technique capable of washing and drying the wet gel without shrinkage while maintaining the structure of the wet gel as it is.

Also, the dried silica aerogel maintains low thermal conductivity immediately after the drying, but the thermal conductivity may gradually increase because a hydrophilic silanol group (Si—OH) present on the surface of silica absorbs water in the air. Therefore, there is a need to modify the surface of the silica aerogel into hydrophobic in order to maintain low thermal conductivity.

In the present invention, a method for preparing a hydrophobic silica aerogel is provided, in which a hydrophobic silica aerogel having excellent physical properties may be prepared while maintaining a pore structure and low thermal conductivity without shrinkage of a wet gel by simultaneously performing washing and drying as well as solvent substitution if necessary on the hydrophobic silica wet gel, which is used in the preparation of the hydrophobic silica aerogel, by using a Soxhlet extraction method.

Specifically, the method for preparing a hydrophobic silica aerogel according to an embodiment of the present invention includes Soxhlet extracting a hydrophobic silica wet gel.

In the preparation method, the hydrophobic silica wet gel may be a hydrophobic silica lyogel, in which the hollow of the wet gel is filled with a non-polar organic solvent, or a hydrophobic silica hydrogel in which the hollow of the wet gel is filled with water.

The above-described hydrophobic silica wet gel may be prepared by using a typical preparation method. Specifically, the hydrophobic silica wet gel may be prepared by adding a surface modifier and an inorganic acid to a water glass solution and performing a reaction. In this case, in the case that the hydrophobic silica wet gel is a lyogel, a non-polar organic solvent is further added before or after the addition of the surface modifier, or simultaneously with the surface modifier, and thus, water may be removed from the hollow of the wet gel to prepare a hydrophobic silica lyogel that is filled with the non-polar organic solvent. In the case in which the non-polar organic solvent is not added, a hydrophobic silica hydrogel may be obtained in which the hollow of the wet gel is filled with water. Thus, the method for preparing a hydrophobic silica aerogel according to the embodiment of the present invention may further include preparing the hydrophobic silica wet gel.

FIG. 1 is a block diagram sequentially illustrating a preparation process of a hydrophobic silica aerogel according to an embodiment of the present invention, in which the preparing of the hydrophobic silica wet gel is further included. FIG. 1 is only an example for describing the present invention and the scope of the present invention is not limited thereto. Hereinafter, the present invention will be described in more detail with reference to FIG. 1.

Step 1 of preparing a hydrophobic silica aerogel according to an embodiment of the present invention is preparing a hydrophobic silica wet gel.

Specifically, the hydrophobic silica wet gel may be prepared by adding a surface modifier and an inorganic acid to a water glass solution and performing a reaction. In this case, the reaction for the preparation of the hydrophobic silica wet gel may be performed by stirring in a temperature range of 25° C. to 80° C. for 10 minutes to 4 hours, but the present invention is not limited thereto.

Also, the water glass solution, which may be used in the preparation of the hydrophobic silica wet gel, may be prepared by adding water, specifically, distilled water, to water glass and mixing the solution. The water glass is not particularly limited, but may include silica ($SiO_2$) in an amount of 28 wt % to 30 wt %. Furthermore, the water glass solution may include silica in an amount of 0.1 wt % to 10 wt %.

In the preparation of the hydrophobic silica wet gel, the surface modifier and the inorganic acid may be sequentially added to the water glass solution or may be simultaneously added, and for example, the surface modifier and the inorganic acid may be sequentially added in consideration of a surface modification effect.

Also, the surface modifier and the water glass solution may be added in a volume ratio of 0.05:1 to 0.3:1. In this case, as described above, the water glass solution may include silica in an amount of 0.1 wt % to 10 wt %. In the case that the surface modifier is added in a volume ratio of less than 0.05, since the amount of the surface modifier able to react with a silanol group (Si—OH) is relatively smaller than the amount of the silanol group (Si—OH) present in the water glass solution, surface modification rate may be decreased and there is a risk that surface modification may not be smoothly performed. As a result, the silanol group, which is not surface-modified during a drying process, causes a condensation reaction so that the size of pores in the resultant silica aerogel powder may be decreased and porosity may not be obtained. Furthermore, in the case in which the surface modifier is added in a volume ratio of greater than 0.3, economic efficiency may be reduced.

The surface modifier, which may be used in the preparation of the silica wet gel, may be an organosilicon compound. Specifically, the surface modifier may be a silane-based compound, a siloxane-based compound, a silanol-based compound, or a silazane-based compound, and these compounds may be used alone or in a mixture of two or more thereof.

Specific examples of the silane-based compound may be dimethyldimethoxysilane, dimethyldiethoxysilane, methyltrimethoxysilane, vinyltrimethoxysilane, phenyltrimethoxysilane, tetraethoxysilane, dimethyldichlorosilane, or 3-aminopropyltriethoxysilane.

Specific examples of the siloxane-based compound may be polydimethylsiloxane, polydiethylsiloxane, or octamethyl cyclotetra siloxane.

Also, specific examples of the silanol-based compound may be trimethylsilanol, triethylsilanol, triphenylsilanol, and t-butyldimethylsilanol.

Furthermore, specific examples of the silazane-based compound may be 1,2-diethyldisilazane, 1,1,2,2-tetramethyldisilazane, 1,1,3,3-tetramethyldisilazane, hexamethyldisilazane, 1,1,2,2-tetraethyldisilazane, or 1,2-diisopropyldisilazane.

For example, the surface modifier may be a disilazane-based compound of Chemical Formula 1 below.

[Chemical Formula 1]

In Chemical Formula 1, $R^1$ each independently represent a hydrogen atom or an alkyl group having 1 to 8 carbon atoms, $R^2$ each independently represent a hydrogen atom or an alkyl group having 1 to 8 carbon atoms, and $R^1$ and $R^2$ are not simultaneously hydrogen atoms.

Since one molecule of the alkyldisilazane-based compound may react with two hydrophilic groups (—OH) on the surface of silica, a large amount of the alkyldisilazane-based compound may be required for the surface modification of the silica which is included in the water glass dispersion solution. However, since the amount of a hydrophobic group, specifically, an alkyl group, in the molecule is large, an effect of increasing the degree of hydrophobicity during the surface modification is significant.

Among the disilazane-based compounds of Chemical Formula 1, the surface modifier may be tetraalkyldisilazane including two hydrogen atoms as well as four alkyl groups having 1 to 4 carbon atoms, or hexaalkyldisilazane including six alkyl groups having 1 to 4 carbon atoms.

Also, in consideration of the reactivity with silica, the surface modifier may be alkyltrialkoxysilane having excellent reactivity in which one molecule of the alkyltrialkoxysilane may react with 3 hydrophilic groups (—OH) on the surface of water glass like methyltrimethoxysilane. In this case, the alkyl group may be an alkyl group having 1 to 4 carbon atoms and the alkoxy group may be an alkoxy group having 1 to 4 carbon atoms.

Furthermore, the surface modifier may be a hydrated organosilicon compound. In the case that the hydrated organosilicon compound is used as described above, since the reactivity with silica may be increased, surface modification may be more effectively achieved. As a result, a hydrophobic silica aerogel having significantly improved tap density and specific surface area may be prepared while maintaining the good degree of hydrophobicity.

The hydrate of the organosilicon compound may be prepared according to a typical method and used, or may be commercially obtained and used. Specifically, in the case that the hydrate of the organosilicon compound is directly prepared and used, the hydrate of the organosilicon compound may be prepared by mixing the organosilicon compound with water in a weight ratio of 1:0.5 to 1:15 and then stirring for 20 hours to 30 hours. For example, in the case in which the organosilicon compound is an alkyldisilazane-based compound, a hydrate of the alkyldisilazane-based compound may be prepared by mixing the alkyldisilazane-based compound with water in a weight ratio of 1:1 to 1:15 and then stirring for 20 hours to 30 hours. Also, in the case that the organosilicon compound is an alkyltrialkoxysilane-based compound, a hydrate of the alkyltrialkoxysilane-based compound may be prepared by mixing the alkyltrialkoxysilane-based compound with water in a weight ratio of 1:0.5 to 1:2 and then stirring for 20 hours to 30 hours.

In the case that the surface modifier is hydrated, the water glass solution may be further diluted by water which is included in the surface modifier. Thus, in the case that the surface modifier is hydrated, water glass itself (includes 28 wt % to 30 wt % of silica) or a water glass solution, in which the amount of silica is diluted to 3 wt % to 30 wt %, may be used as the water glass solution.

Specifically, in consideration of surface modification efficiency on the silica wet gel and the effect of increasing hydrophobicity in accordance therewith, the surface modifier may include at least one selected from the group consisting of hexamethyldisilazane, tetramethyldisilazane, and a hydrate thereof, and for example, may include hexamethyldisilazane.

Specifically, the inorganic acid, which may be used in the preparation of the hydrophobic silica wet gel, may include at least one selected from the group consisting of nitric acid, hydrochloric acid, acetic acid, sulfuric acid, and hydrofluoric acid, and may be nitric acid among these acids. The inorganic acid may decompose the surface modifier by rapidly reacting with the surface modifier, and accordingly, the reaction between the water glass solution and the surface modifier may be promoted to form a hydrophobic silica sol. Also, the inorganic acid may promote the gelation of the hydrophobic silica sol by controlling pH. Thus, the inorganic acid may simultaneously induce the surface modification and gelation to prepare a hydrophobic silica wet gel.

Furthermore, in the preparation of the hydrophobic silica wet gel, a non-polar organic solvent may be further selectively added before or after the addition of the surface modifier, or simultaneously with the addition of the surface modifier. The non-polar organic solvent may prevent the shrinkage of pores and cracking, which may be occurred when water present in the hollow of the hydrophobic silica wet gel is evaporated to a gas phase during the drying of the hydrophobic silica wet gel, by substituting the water present in the hollow of the prepared hydrophobic silica wet gel. As a result, the decrease in specific surface area and the changes in pore structure, which occur during the drying of the hydrophobic silica wet gel, may be prevented.

Specifically, the non-polar organic solvent may include at least one selected from the group consisting of hexane, heptane, toluene, and xylene, but the present invention is not limited thereto. For example, the non-polar organic solvent may be hexane.

Next, step 2 of preparing the hydrophobic silica aerogel according to the embodiment of the present invention is preparing a hydrophobic silica aerogel by performing a Soxhlet extraction on the hydrophobic silica wet gel prepared in Step 1.

Washing and drying as well as solvent substitution if necessary may be simultaneously performed on the hydrophobic silica wet gel during the Soxhlet extraction.

Specifically, as described above, with respect to the hydrophobic silica lyogel in which the hollow of the hydrophobic silica wet gel is filled with the non-polar organic solvent, washing and drying may be simultaneously performed on the hydrophobic silica lyogel by the Soxhlet extraction. Also, with respect to the hydrophobic silica hydrogel in which the hollow of the hydrophobic silica wet gel is filled with water, washing and drying as well as solvent substitution may be simultaneously performed on the hydrophobic silica hydrogel during the Soxhlet extraction.

The Soxhlet extraction may be performed by using a typical Soxhlet extractor.

In general, the Soxhlet extractor is a device in which an extraction tube is disposed on a solvent flask and a reflux condenser is connected to the extraction tube, wherein, when a sample is put in a cylindrical filter paper or a filtration tube (thimble) in the extraction tube and a solvent in the flask is heated, the solvent is evaporated to a gas phase, the gas-phase solvent is condensed in the reflux condenser and fills the extraction tube to dissolve soluble components in the sample, the filled liquid is entirely returned to the solvent flask by a siphon arm when the liquid reaches the top of the siphon arm, and a new solvent fills the extraction tube again. When the extraction is repeated with the new solvent and the extraction is completed, the flask is detached and non-volatile components, i.e., the end product, remain in the flask by evaporating the liquid in the flask. A dried product having impurities removed therefrom may be obtained by a solvent extraction method using the Soxhlet extractor, which includes the above-described operation.

Figure 2:
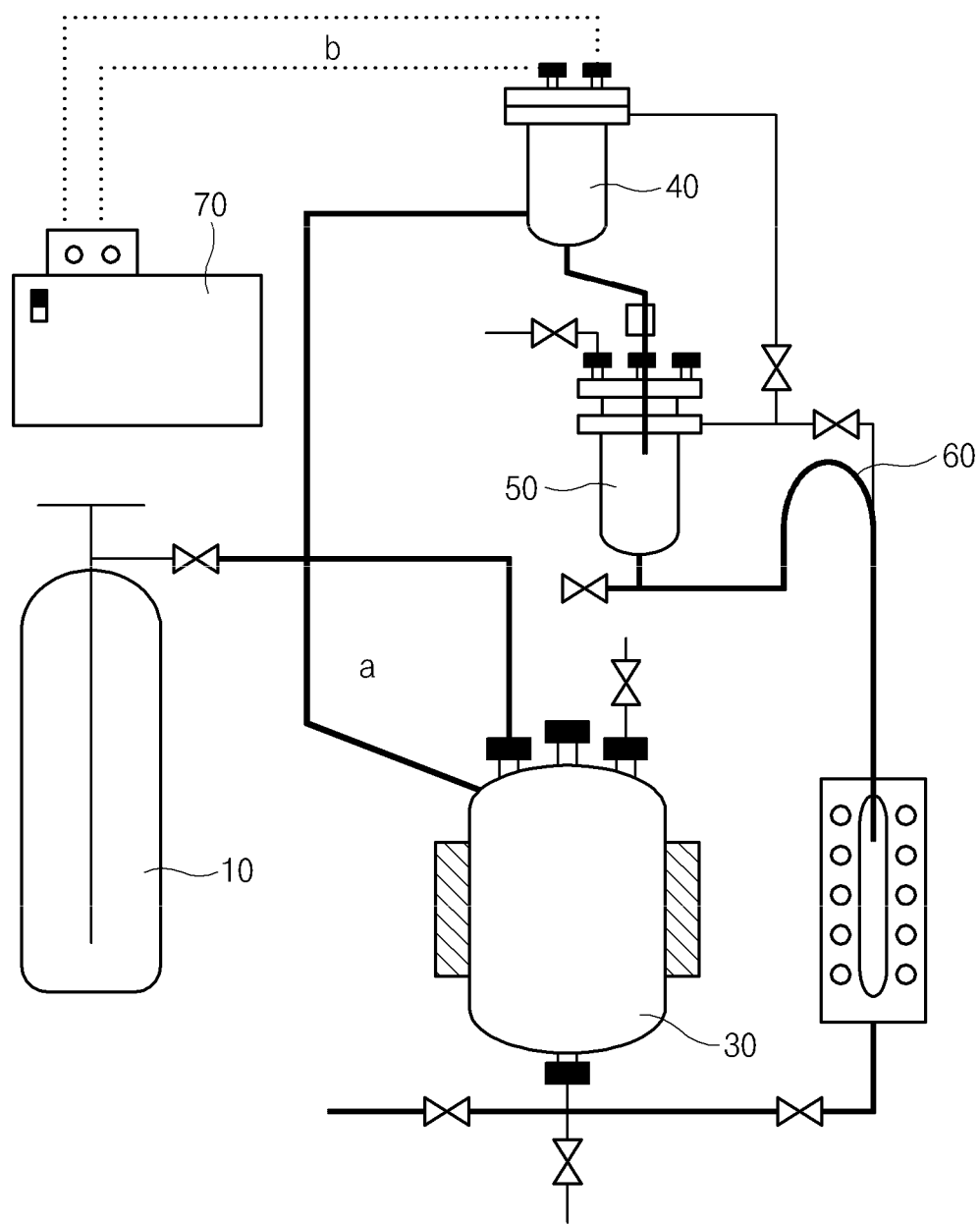
FIG. 2 is a structure diagram schematically illustrating a Soxhlet extractor which may be used in the preparation of the hydrophobic silica aerogel according to the embodiment of the present invention.

FIG. 2 is a structure diagram schematically illustrating a structure of a Soxhlet extractor for a Soxhlet extraction in the preparation of the hydrophobic silica aerogel according to the embodiment of the present invention. FIG. 2 is only an example for describing the present invention and the scope of the present invention is not limited thereto. Hereinafter, the present invention will be described in more detail with reference to FIG. 2.

As illustrated in FIG. 2, the Soxhlet extractor 100 includes a reboiler 30, a condenser 40, and an extractor 50, and may further include an extraction solvent reservoir 10 which is connected to the reboiler 30 to supply an extraction solvent to the reboiler 30, a cooling circulation tank 70 which is connected to the condenser 40 to maintain the temperature of cooling water in the condenser 40, and a siphon arm 60 which is connected to the extractor 50 to vent the extraction solvent from the extractor 50. Also, the reboiler 30, the condenser 40, and the extractor 50 may be connected to one another through a pipe to form loop 1(a), and the condenser 40 may be connected to the cooling circulation tank 70 through a pipe to form loop 2(b). Loop 1(a) is a pipeline through which the extraction solvent circulates during an extraction process, and loop 2(b) is a pipeline through which the cooling water circulates.

The Soxhlet extraction according to an embodiment of the present invention may be performed by the following steps:

Step A: supplying a hydrophobic silica wet gel into the extractor 50;

Step B: performing an extraction by flowing an extraction solvent contained in the reboiler 30 into the extractor 50 including the hydrophobic silica wet gel through the condenser 40; and Step C: venting the extraction solvent, which is obtained as a result of the extraction, from the extractor 50.

Step A is a step of introducing a Soxhlet thimble filled with the hydrophobic silica wet gel into the extractor 50 and assembling the extractor 50 in order to remove impurities (sodium ions, unreacted materials, by-product, water, etc.) in the hydrophobic silica wet gel and obtain a dried hydrophobic silica aerogel. As described above, the hydrophobic silica wet gel may be a hydrophobic silica lyogel or a hydrophobic silica hydrogel, and in the case that the hydrophobic silica wet gel is a hydrophobic silica hydrogel, the Soxhlet extraction according to the embodiment of the present invention may simultaneously perform washing and drying as well as solvent substitution.

Step B is a step of performing a Soxhlet extraction by flowing an extraction solvent contained in the reboiler 30 into the extractor 50 including the hydrophobic silica wet gel through the condenser 40, in order to extract the impurities by injecting the extraction solvent into the extractor 50.

The extraction solvent is evaporated in the reboiler 30 to be transferred to the condenser 40 through a pipe and the transferred extraction solvent is liquefied by the condenser 40 and injected into the extractor 50 through a pipe to perform an extraction. Once the extraction is complete, the extraction solvent used is vented from the extractor 50 to be returned to the reboiler 30. That is, the extraction solvent may extract the impurities in the hydrophobic silica wet gel while circulating along loop 1(a) in the sequence of the reboiler 30>>the condenser 40>>the extractor 50>>the reboiler 30. In particular, due to the siphon arm 60, when the liquefied extraction solvent fills the extractor 50 as high as the top of the siphon arm 60, all of the extracted solvent in the extractor 50 is automatically transferred to the reboiler 30 by gravitation, and the extraction of the impurities may be easily performed while the Soxhlet extraction process is repeated.

During the Soxhlet extraction, a temperature of the reboiler 30 may be in a range of 25° C. to 40° C., and a temperature of the condenser 40 may be in a range of −20° C. to 10° C. Also, the Soxhlet extraction may be performed in a pressure of 5 bar to 70 bar. In this case, the pressure may vary depending on the extraction solvent used. The Soxhlet extraction may be performed under the above-described conditions for 1 hour to 10 hours, but the present invention is not limited thereto.

As the extraction solvent usable during the Soxhlet extraction, any extraction solvent may be used as long as it is easily evaporated in the reboiler and is easily liquefied in the condenser. Specifically, a compound that exists in a gas phase under conditions including a temperature of 20° C. to 40° C. and a pressure of 0.5 atm to 1.5 atm may be used as the extraction solvent.

Also, the extraction solvent may have a vapor pressure of 100 kPa or more at 20° C., specifically, 100 kPa to 10 MPa, so as to prevent the shrinkage and cracking of the pore structure in a silica sol by easily evaporating during the Soxhlet extraction process.

Furthermore, the extraction solvent may have low surface tension so as to prevent the shrinkage and cracking of the pore structure in the silica sol during the drying process. Specifically, the extraction solvent may have a surface tension of 12 mN/m or less, for example, 0.1 mN/m to 12 mN/m.

For example, the extraction solvent may be a non-polar solvent such as carbon dioxide; or a polar solvent, such as dimethyl ether, satisfying the above-described conditions. Specifically, the extraction solvent may be a non-polar solvent, such as carbon dioxide, satisfying the above-described conditions in consideration of excellence in solvent substitution.

The Soxhlet extraction may be performed in a pressure of 5 bar to 70 bar, and, in the case that the extraction solvent is carbon dioxide, the Soxhlet extraction may be performed in a pressure of 40 bar to 70 bar, for example, 40 bar to 60 bar. Also, in the case in which the extraction solvent is dimethyl ether, the Soxhlet extraction may be performed in a pressure of 5 bar to 20 bar.

Step C is for obtaining a hydrophobic silica aerogel by removing the extraction solvent, which is obtained as a result of the extraction, from the extractor 50, and Step C may be performed by venting the extraction solvent by switching off the reboiler 30 and the condenser 40 and gradually increasing the temperature of the extractor 50 after the extraction of the impurities is completed. Also, when the extraction solvent is entirely vented to reach the atmospheric pressure, a hydrophobic silica aerogel may be obtained by opening the extractor 50.

Furthermore, after the Soxhlet extraction, a drying process, specifically, a vacuum drying process, for removing the extraction solvent which may remain in the silica aerogel may be selectively further performed. Accordingly, the method for preparing a hydrophobic silica aerogel according to the embodiment of the present invention may selectively further include the drying process, specifically, the vacuum drying process, after the Soxhlet extraction, and in this case, the drying process may be performed according to a typical method.

According to another embodiment of the present invention, a hydrophobic silica aerogel prepared by the above-described preparation method is provided.

Specifically, the hydrophobic silica aerogel prepared by the above-described preparation method may be hydrophobic silica aerogel powder having low tap density and high specific surface area due to the implementation of the Soxhlet extraction process. For example, the hydrophobic silica aerogel according to the embodiment of the present invention may have a specific surface area of 650 $m^2/g$ to 720 $m^2/g$ and a tap density of 0.09 g/ml to 0.24 g/ml. Also, the hydrophobic silica aerogel powder may have a carbon content of 9% or more based on a total weight of the powder.

The silica aerogel having low tap density and high specific surface area as well as high hydrophobicity may be used in various fields, such as insulation materials, ultra-low dielectric thin films, catalysts, catalyst supports, or blankets, and may be particularly suitable for the preparation of an insulation blanket because the silica aerogel has low thermal conductivity due to the above-described physical properties.

Hereinafter, the present invention will be described in more detail, according to the following examples and experimental examples. However, the following examples and experimental examples are merely presented to exemplify the present invention, and the scope of the present invention is not limited thereto.

EXAMPLE 1

(1-1) Hydrophobic Silica Lyogel Preparation 11.6 ml of hexamethyldisilazane was added to 100 g (about 100 ml) of a water glass solution, which was prepared by introducing distilled water into water glass (silica content: 28 to 30 wt %, $SiO_2:Na_2O=3.52:1$, YOUNG IL CHEMICAL COMPANY CO., LTD.) to obtain a silica ($SiO_2$) content of 4.35 wt %, and then mixed. 120 ml of n-hexane was added thereto and mixed.

The resulting mixed solution was maintained at 50° C., and a hydrophobic silica lyogel was prepared by performing a reaction by adding 4.6 ml of 70% $HNO_3$ thereto and stirring at 300 rpm for 3 hours.

(1-2) Preparation of Hydrophobic Silica Aerogel

A Soxhlet extraction was performed to obtain a hydrophobic silica aerogel by washing and drying the hydrophobic silica lyogel that was prepared in Example (1-1).

First, temperatures of a reboiler and a condenser were respectively set to 30° C. and 5° C., a Soxhlet thimble was filled with the hydrophobic silica lyogel when the temperatures were maintained, and the Soxhlet thimble was put in an extractor and assembled. Thereafter, the reboiler was filled with liquid carbon dioxide ($CO_2$) (vapor pressure at 20° C.: 2.73 MPa, surface tension: 0.35 mN/m) so as to obtain a pressure of 60 bar, and the extraction was performed for 7 hours. The reboiler and the condenser were switched off after the extraction was completed, and carbon dioxide was vented while gradually increasing the temperature of the extractor to 60° C. In this case, since carbon dioxide and hydrophobic silica aerogel powder generated may freeze together in the thimble when rapidly venting the carbon dioxide, the carbon dioxide was slowly vented. After the venting, a hydrophobic silica aerogel was prepared without an additional drying process.

EXAMPLE 2

(2-1) Hydrophobic Silica Lyogel Preparation

A hydrophobic silica lyogel was prepared in the same manner as in Example (1-1).

(2-2) Preparation of Hydrophobic Silica Aerogel

A Soxhlet extraction was performed to obtain a hydrophobic silica aerogel by washing and drying the hydrophobic silica lyogel that was prepared in Example (2-1).

First, temperatures of a reboiler and a condenser were respectively set to 30° C. and −5° C., a Soxhlet thimble was filled with the hydrophobic silica lyogel when the temperatures were maintained, and the Soxhlet thimble was put in an extractor and assembled. Thereafter, the reboiler was filled with 550 ml of liquid dimethyl ether (vapor pressure at 20° C.: greater than 100 kPa, surface tension: 11.7 mN/m), and the extraction was performed at a pressure of 5 bar for 7 hours. The reboiler and the condenser were switched off after the extraction was completed, and dimethyl ether was vented while gradually increasing the temperature of the extractor to 60° C. In this case, since dimethyl ether and hydrophobic silica aerogel powder generated may freeze together in the thimble when rapidly venting the dimethyl ether, the dimethyl ether was slowly vented. After the venting, a hydrophobic silica aerogel was prepared without an additional drying process.

EXAMPLE 3

(3-1) Hydrophobic Silica Hydrogel Preparation 11.6 ml of hexamethyldisilazane was added to 100 g of a water glass solution, which was prepared by introducing distilled water into water glass (silica content: 28 to 30 wt %, $SiO_2:Na_2O=3.52:1$, YOUNG IL CHEMICAL COMPANY CO., LTD.) to obtain a silica ($SiO_2$) content of 4.35 wt %, and then mixed.

The resulting mixed solution was maintained at 70° C., and a hydrophobic silica hydrogel was prepared by adding 4.6 ml of 70% HNO$_3$ thereto and stirring at 300 rpm for 25 minutes.

(3-2) Preparation of Hydrophobic Silica Aerogel

A hydrophobic silica aerogel was obtained by Soxhlet extracting in the same manner as in Example (1-2) except that the hydrophobic silica hydrogel prepared in Example (3-1) was used instead of the hydrophobic silica lyogel.

EXAMPLE 4

(4-1) Hydrophobic Silica Hydrogel Preparation

A hydrophobic silica hydrogel was prepared in the same manner as in Example (3-1).

(4-2) Preparation of Hydrophobic Silica Aerogel

A hydrophobic silica aerogel was prepared in the same manner as in Example (2-2) except that the hydrophobic silica hydrogel prepared in Example (4-1) was used instead of the hydrophobic silica lyogel.

EXAMPLE 5

(5-1) Hydrophobic Silica Lyogel Preparation

A hydrophobic silica lyogel was prepared in the same manner as in Example (1-1) except that 1,1,3,3-tetramethyldisilazane was used instead of hexamethyldisilazane.

(5-2) Preparation of Hydrophobic Silica Aerogel

A hydrophobic silica aerogel was obtained by Soxhlet extracting in the same manner as in Example (1-2) except that the hydrophobic silica lyogel prepared in Example (5-1) was used.

EXAMPLE 6

(6-1) Hydrophobic Silica Lyogel Preparation

A hydrophobic silica lyogel was prepared in the same manner as in Example (1-1) except that hydrated hexamethyldisilazane was used instead of hexamethyldisilazane. In this case, the hydrated hexamethyldisilazane was prepared by mixing 10 g of hexamethyldisilazane and 10 g of distilled water and stirring for 20 hours.

(6-2) Preparation of Hydrophobic Silica Aerogel

A hydrophobic silica aerogel was obtained by Soxhlet extracting in the same manner as in Example (1-2) except that the hydrophobic silica lyogel prepared in Example (6-1) was used.

EXAMPLE 7

(7-1) Hydrophobic Silica Lyogel Preparation

A hydrophobic silica lyogel was prepared in the same manner as in Example (1-1) except that methyltrimethoxysilane was used instead of hexamethyldisilazane.

(7-2) Preparation of Hydrophobic Silica Aerogel

A hydrophobic silica aerogel was obtained by Soxhlet extracting in the same manner as in Example (1-2) except that the hydrophobic silica lyogel prepared in Example (7-1) was used.

EXAMPLE 8

(8-1) Hydrophobic Silica Lyogel Preparation

A hydrophobic silica lyogel was prepared in the same manner as in Example (1-1) except that hydrated methyltrimethoxysilane was used instead of hexamethyldisilazane.

(8-2) Preparation of Hydrophobic Silica Aerogel

A hydrophobic silica aerogel was obtained by Soxhlet extracting in the same manner as in Example (1-2) except that the hydrophobic silica lyogel prepared in Example (8-1) was used.

EXAMPLE 9

(9-1) Hydrophobic Silica Lyogel Preparation

A hydrophobic silica lyogel was prepared in the same manner as in Example (1-1) except that trimethylsilanol was used instead of hexamethyldisilazane.

(9-2) Preparation of Hydrophobic Silica Aerogel

A hydrophobic silica aerogel was obtained by Soxhlet extracting in the same manner as in Example (1-2) except that the hydrophobic silica lyogel prepared in Example (9-1) was used.

COMPARATIVE EXAMPLE 1

(1-1) Hydrophobic Silica Lyogel Preparation

A hydrophobic silica lyogel was prepared in the same manner as in Example (1-1).

(1-2) Preparation of Hydrophobic Silica Aerogel

The hydrophobic silica lyogel prepared in Comparative Example (1-1) was washed two times with n-hexane (surface tension at 20° C.: 17.9 mN/m) and then dried in an oven at 150° C. for 1 hour to prepare a hydrophobic silica aerogel.

COMPARATIVE EXAMPLE 2

(2-1) Hydrophobic Silica Hydrogel Preparation

A hydrophobic silica hydrogel was prepared in the same manner as in Example (3-1).

(2-2) Preparation of Hydrophobic Silica Aerogel

The hydrophobic silica hydrogel prepared in Comparative Example (2-1) was washed two times with n-hexane and then dried in an oven at 150° C. for 1 hour to prepare a hydrophobic silica aerogel.

Each hydrophobic silica aerogel prepared in Examples 1 to 9 and Comparative Examples 1 and 2 is summarized and presented in Table 1 below.

TABLE 1

| Category | Surface modifier type | Wet gel type | Extraction solvent | Washing/drying method |
|---|---|---|---|---|
| Example 1 | Hexamethyldisilazane | Silica lyogel | Carbon dioxide | Soxhlet extraction |
| Example 2 | Hexamethyldisilazane | Silica lyogel | Dimethyl ether | Soxhlet extraction |
| Example 3 | Hexamethyldisilazane | Silica hydrogel | Carbon dioxide | Soxhlet extraction |

TABLE 1-continued

| Category | Surface modifier type | Wet gel type | Extraction solvent | Washing/drying method |
|---|---|---|---|---|
| Example 4 | Hexamethyldisilazane | Silica hydrogel | Dimethyl ether | Soxhlet extraction |
| Example 5 | 1,1,3,3-tetramethyldisilazane | Silica lyogel | Carbon dioxide | Soxhlet extraction |
| Example 6 | Hydrated hexamethyldisilazane | Silica lyogel | Carbon dioxide | Soxhlet extraction |
| Example 7 | Methyltrimethoxysilane | Silica lyogel | Carbon dioxide | Soxhlet extraction |
| Example 8 | Hydrated methyltrimethoxysilane | Silica lyogel | Carbon dioxide | Soxhlet extraction |
| Example 9 | Trimethylsilanol | Silica lyogel | Carbon dioxide | Soxhlet extraction |
| Comparative Example 1 | Hexamethyldisilazane | Silica lyogel | n-hexane | High-temperature atmospheric pressure drying |
| Comparative Example 2 | Hexamethyldisilazane | Silica hydrogel | n-hexane | High-temperature atmospheric pressure drying |

EXPERIMENTAL EXAMPLE 1

Physical Property Evaluation

Tap densities, specific surface areas, and carbon contents of the spherical hydrophobic silica aerogels prepared in the examples and comparative examples were measured, and the results thereof are presented in Table 2 below.

(1) Tap Density

Tap densities were measured using a tap density volumeter (Engelsmann Model STAV II).

(2) Specific Surface Area (Brunauer-Emmett-Teller (BET) Surface Area)

Specific surface areas were analyzed from a nitrogen gas adsorption amount, which was adsorbed according to partial pressure ($0.11 < p/p_o < 1$), using a Micromeritics 3Flex analyzer.

(3) Carbon Content

Carbon contents were measured using a carbon analyzer.

TABLE 2

| Category | Tap density (g/ml) | Specific surface area (m²/g) | Carbon content (wt %) |
|---|---|---|---|
| Example 1 | 0.09 | 720 | 10.73 |
| Example 2 | 0.18 | 690 | 10.39 |
| Example 3 | 0.14 | 700 | 11.3 |
| Example 4 | 0.24 | 650 | 12.2 |
| Example 5 | 0.10 | 720 | 10.33 |
| Example 6 | 0.09 | 710 | 10.73 |
| Example 7 | 0.15 | 690 | 10.01 |
| Example 8 | 0.14 | 700 | 9.30 |
| Example 9 | 0.14 | 700 | 10.05 |
| Comparative Example 1 | 0.09 | 710 | 10.32 |
| Comparative Example 2 | 0.22 | 650 | 11.4 |

As illustrated in Table 2, the hydrophobic silica aerogels of Examples 1 to 9, which were prepared by the method for preparing a hydrophobic silica aerogel of the present invention using the Soxhlet extraction method, exhibited low tap densities, high specific surface areas, and high hydrophobicities. An effect of improving the physical properties and the degree of hydrophobicity of the hydrophobic silica aerogels of Examples 1 to 9 was the same as or better than that of Comparative Examples 1 and 2 which were prepared by a typical method for preparing a hydrophobic silica aerogel.

In the case that the hydrophobic silica wet gel used for the preparation of the hydrophobic silica aerogel was a lyogel, the hydrophobic silica aerogel of Example 1 prepared by using non-polar carbon dioxide as a Soxhlet extraction solvent exhibited lower tap density, higher specific surface area, and higher degree of hydrophobicity than the hydrophobic silica aerogel of Example 2 using dimethyl ether as a Soxhlet extraction solvent. Thus, it may be understood that physical properties of the hydrophobic silica aerogel may be further improved by using a non-polar extraction solvent, such as carbon dioxide, during the Soxhlet extraction of the hydrophobic silica lyogel.

In the case in which the hydrophobic silica wet gel was a hydrogel, the hydrophobic silica aerogel of Example 3 prepared using non-polar carbon dioxide as a Soxhlet extraction solvent exhibited a lower carbon content, but exhibited lower tap density and higher specific surface area than the hydrophobic silica aerogel of Example 4 using dimethyl ether as an extraction solvent. The reason for this may be explained as follows. In the preparation of the hydrophobic silica aerogel using a hydrophobic silica hydrogel, washing and dying as well as solvent substitution of the hydrophobic silica hydrogel may occur during the Soxhlet extraction, and in this case, since it is more advantageous to use the non-polar carbon dioxide than to use the polar dimethyl ether in terms of the solvent substitution, the reduction of the specific surface area and the changes in the pore structure were small during the drying of the silica hydrogel. As a result, it may be understood that the case of using the non-polar solvent, such as carbon dioxide, as an extraction solvent was better in terms of the effect of improving the tap density and specific surface area of the finally prepared hydrophobic silica aerogel.

Also, in the preparation of the silica aerogel by the Soxhlet extraction using the same extraction solvent, the silica aerogels of Examples 1 and 2 using the silica lyogel exhibited more improved tap densities and specific surface areas than Examples 3 and 4 prepared using the silica hydrogel, because washing and drying were stably performed without solvent substitution during the Soxhlet extraction. In contrast, with respect to the silica aerogels of Examples 3 and 4 prepared using the silica hydrogel, since a non-aqueous organic solvent, such as n-hexane, was not used during the preparation process, the concentration of the surface modifier was relatively increased to exhibit a higher carbon content than the silica aerogels of Examples 1 and 2 using the silica lyogel.

Furthermore, in the preparation of the silica aerogel by the Soxhlet extraction using the same extraction solvent, when examining Examples 1 and 5 to 9 in which the silica lyogels were prepared by variously changing the surface modifiers, the silica aerogels of Examples 1, 5, and 6 using the disilazane-based compound or the hydrate thereof exhibited more improved physical properties and degree of hydrophobicity than Examples 7 to 9 using the silane-based compound or silanol-based compound. The reason for this is that since ratios of hydrophobic alkyl groups in molecules of the disilazane-based compounds that were used in Examples 1, 5, and 6 were higher than those of the silane-based and silanol-based compounds that were used in Examples 7 and 8, the degree of hydrophobicity and the physical properties of the finally prepared silica aerogel may be further improved.

From the above-described experimental results, it may be understood that a silica aerogel having low tap density, high specific surface area, and high hydrophobicity may be prepared by the preparation method using a Soxhlet extraction according to the present invention, and the preparation of a hydrophobic silica aerogel may be more easily performed than a typical preparation method by simultaneously performing washing and drying as well as solvent substitution if necessary by the Soxhlet extraction.

INDUSTRIAL APPLICABILITY

Since a preparation method according to the present invention may simultaneously perform washing and drying of a hydrophobic silica wet gel as well as solvent substitution and may remove an extraction solvent without an additional separation process, a hydrophobic silica aerogel having low tap density and high specific surface area may be easily prepared. Accordingly, the silica aerogel prepared by the above preparation method may be used in various fields, such as insulation materials, ultra-low dielectric thin films, catalysts, catalyst supports, or blankets, and may be particularly suitable for the preparation of an insulation blanket because the silica aerogel has low thermal conductivity due to the above-described physical properties.

The invention claimed is:

1. A method for preparing a hydrophobic silica aerogel, the method comprising Soxhlet extracting a hydrophobic silica wet gel, wherein solvent substitution, washing, and drying are simultaneously performed on the hydrophobic silica wet gel during the Soxhlet extraction, and
wherein the Soxhlet extraction is performed at a reboiler temperature of 25° C. to 40° C., a condenser temperature of −20° C. to 10° C., and a pressure of 5 bar to 70 bar.

2. The method of claim 1, wherein the hydrophobic silica wet gel is prepared by adding a surface modifier and an inorganic acid to a water glass solution and performing a reaction.

3. The method of claim 2, wherein the surface modifier and the water glass solution are added in a volume ratio of 0.05:1 to 0.3:1; and
the water glass solution comprises silica in an amount of 0.1 wt % to 10 wt %.

4. The method of claim 2, wherein the surface modifier comprises any one selected from the group consisting of a silane-based compound, a siloxane-based compound, a silanol-based compound, a silazane-based compound, and a hydrate thereof, or a mixture of two or more thereof.

5. The method of claim 2, wherein the surface modifier comprises any one selected from the group consisting of hexaalkyldisilazane, tetraalkyldisilazane, and a hydrate thereof, or a mixture of two or more thereof.

6. The method of claim 2, wherein the surface modifier comprises any one selected from the group consisting of hexamethyldisilazane, hydrated hexamethyldisilazane, and tetramethyldisilazane, or a mixture of two or more thereof.

7. The method of claim 2, wherein the reaction is performed in a temperature range of 25° C. to 80° C.

8. The method of claim 2, wherein the inorganic acid comprises any one selected from the group consisting of nitric acid, hydrochloric acid, acetic acid, sulfuric acid, and hydrofluoric acid, or a mixture of two or more thereof.

9. The method of claim 2, further adding a non-polar organic solvent to the water glass solution.

10. The method of claim 9, wherein the non-polar organic solvent comprises any one selected from the group consisting of hexane, heptane, toluene, and xylene, or a mixture of two or more thereof.

11. The method of claim 1, wherein the hydrophobic silica wet gel is a hydrophobic silica lyogel or a hydrophobic silica hydrogel.

12. The method of claim 1, wherein the Soxhlet extraction is performed by:
(A) supplying a hydrophobic silica wet gel into an extractor;
(B) performing an extraction by flowing an extraction solvent contained in a reboiler into the extractor including the hydrophobic silica wet gel through a condenser; and
(c) venting the extraction solvent which is obtained as a result of the extraction.

13. The method of claim 12, wherein the extraction solvent is evaporated in the reboiler to be transferred to the condenser and is liquefied in the condenser to be transferred into the extractor.

14. The method of claim 12, wherein the Soxhlet extraction is performed by circulating the extraction solvent in a sequence of the reboiler, the condenser, and the extractor.

15. The method of claim 1, wherein the Soxhlet extraction is performed by using an extraction solvent that exists in a gas phase under conditions including a temperature of 20° C. to 40° C. and a pressure of 0.5 atm to 1.5 atm.

16. The method of claim 1, wherein the Soxhlet extraction is performed by using an extraction solvent that has a vapor pressure of 100 kPa or more at 20° C.

17. The method of claim 1, wherein the Soxhlet extraction is performed by using an extraction solvent that has a surface tension of 12 mN/m or less.

18. The method of claim 1, wherein the Soxhlet extraction is performed by using carbon dioxide or dimethyl ether as an extraction solvent.

19. The method of claim 1, wherein the Soxhlet extraction is performed in a pressure of 40 bar to 70 bar by using carbon dioxide as an extraction solvent.

20. The method of claim 1, wherein the Soxhlet extraction is performed in a pressure of 5 bar to 20 bar by using dimethyl ether as an extraction solvent.

21. The method of claim 1, wherein the Soxhlet extraction is performed by using a non-polar extraction solvent that has a surface tension of 0.1 mN/m to 12 mN/m.

22. The method of claim 1, wherein the hydrophobic silica aerogel is a powder.

23. The method of claim 22, wherein the hydrophobic silica aerogel powder has a specific surface area of 650 $m^2$/g to 720$m^2$/g.

24. The method of claim 22, wherein the hydrophobic silica aerogel powder has a tap density of 0.09 g/ml to 0.24 g/ml.

25. The method of claim 22, wherein the hydrophobic silica aerogel powder is composited with fibers to form a blanket.

* * * * *